United States Patent [19]

Benson et al.

[11] Patent Number: 4,977,821

[45] Date of Patent: Dec. 18, 1990

[54] AUTOMATIC STIRRING OF BATCH FRIED FOOD PRODUCTS

[75] Inventors: Clark K. Benson, Millbrae; Andrew A. Caridis, Foster City, both of Calif.

[73] Assignee: Heat and Control, Inc., South San Francisco, Calif.

[21] Appl. No.: 297,415

[22] Filed: Jan. 13, 1989

[51] Int. Cl.[5] ............................................. A47J 37/12
[52] U.S. Cl. ...................................... 99/348; 99/404; 99/407; 99/409; 426/518
[58] Field of Search .................. 99/403, 404, 405, 407, 99/409, 943 R, 537, 348; 426/518, 438

[56] References Cited

U.S. PATENT DOCUMENTS

| | | | |
|---|---|---|---|
| 2,886,439 | 5/1959 | Eytinge | 99/404 |
| 3,218,959 | 11/1965 | Swisher | 99/348 |
| 4,706,556 | 11/1987 | Wallace | 99/407 |

*Primary Examiner*—Robert W. Jenkins
*Attorney, Agent, or Firm*—Donald N. MacIntosh

[57] ABSTRACT

A food chip cooking process in which uncooked slices are propelled airborne over the cooking vat in a batch, are stirred and submerged to urge the batch from one end of the vat to the other and then removed from the vat for further processing.

4 Claims, 10 Drawing Sheets

AUTOMATIC STIRRING OF BATCH FRIED FOOD PRODUCTS

TECHNICAL FIELD

This invention pertains to batch fried food products and more particularly relates to a method for dispersing, stirring and dunking potato slices during a batch cook cycle.

BACKGROUND ART

A large volume of potato chips are prepared by batch cooking. The resulting chips have a distinctive "bite" or hardness which is one factor which has led to the high market acceptance of this batch cooked product even in competition with potato chips produced in continuous processes.

The typical batch cooker for potato chips includes an open top vat containing a volume of cooking oil, the vat being heated from below and is thus direct fired with the heat being applied to the bottom of the vat. Alternatively, the cooking oil may be heated remotely in a heat exchanger coupled to the cooking vat, or heated by a series of fuel fired immersion burners firing into one or more tubes immersed in the cooking oil. The sliced potatoes may be deposited in the cooking vat from either a moving conveyor belt or from an overhead located potato slicer. The operator or attendant however must observe that the slices do not congregate into clumps when first immersed into the cooking oil which is an undesirable condition leading to a substantial amount of rejected product for failure to meet quality control standards.

During the typical cooking cycle, the attendant, using a wooden rake, stands over the vat and agitates the cooking slices in a personalized stirring pattern so as to keep the slices in movement, to prevent clumping, until full cooking has been achieved. The cooking end point could be determined by visual inspection by the attendant or by a determination that the cooking oil has reached a preselected end temperature or that a time temperature interval has been calculated and a signal given so that the attendant may rake the cooked slices to one end of the vat for removal by a takeout conveyor. Once the slices have been removed from the vat, the attendant can give his attention to an adjacent cooking vat because customarily one attendant or operator serves to keep two cooking vats in production. Thus, while waiting for one batch to come up to the desired cooking temperature, attention could be given to the cooking operation in an adjacent vat which requires the raking of the slices to avoid clumping or agglomeration and to generally oversee the cooking operation.

Cooking potato chips as described above exposes the operator or attendant to an unpleasant work environment of heat and oil fumes. The batch cook process gives a wide variation in product quality and is incapable of achieving good product uniformity such as found in the continuous potato chip processes. These are known shortcomings to the batch cook procedure.

DISCLOSURE OF THE INVENTION

A general object of the invention is to provide an improved process for batch cooking of food products in thin or slice form, such as potato chips.

Another object of the invention is to provide a batch process for cooking potato chips wherein agglomeration or clumping of the uncooked slices is greatly reduced.

Another object is to provide an improved batch process for cooking potato chips with greatly increased uniformity of the cooked product from batch to batch and within each individual batch.

Another object is to provide an improved process which requires a minimum of operator attention because the loading, stirring and removal of the chips takes place in an automatic cycle.

Another object is to provide an improved apparatus for batch cooking of potato chips wherein the uncooked slices may be loaded, mixed, stirred, cooked and removed from the cooking oil in accordance with a preset cooking program.

The invention in summary includes a batch process for cooking food products comprising the steps of providing a vat for containing a hot frying medium or oil which is brought to a desired cooking temperature. Product infeed is such that slices are dispersed from a position over the vat in a blast or stream of air so as to free fall into the vat in substantially a single layer array on the surface of the cooking medium. A motor driven stirring and dunking or submerger agitates the slices during cooking by moving the batch from one end of the vat towards the other while continuously submerging portions of the batch all to insure uniformity of agitation to obtain uniform cooking throughout the batch. When the cooking end point is reached, the slices are moved together towards a removal facility such as a takeout conveyor and the cooking oil is again prepared to receive a subsequent batch of potato slices.

The above and additional objects and features of the invention will appear from the following specification in which a preferred embodiment has been set forth in detail and illustrated in the accompanying drawings.

BEST MODE OF CARRYING OUT THE INVENTION

Figure 1:
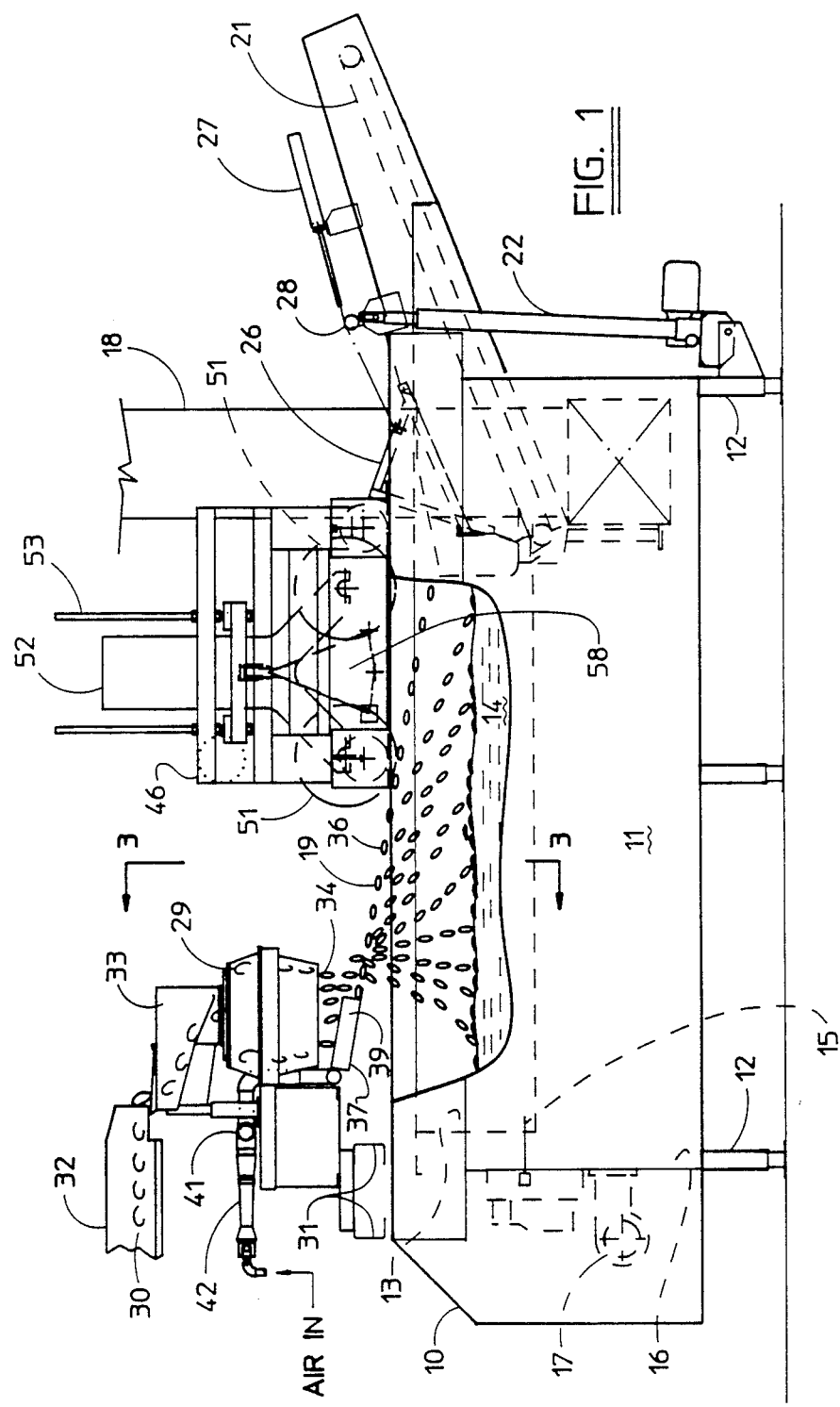
FIG. 1 of the drawings is a side elevational view, partially broken away, of apparatus especially adapted and equipped for carrying out the process of the present invention.
Figure 2:
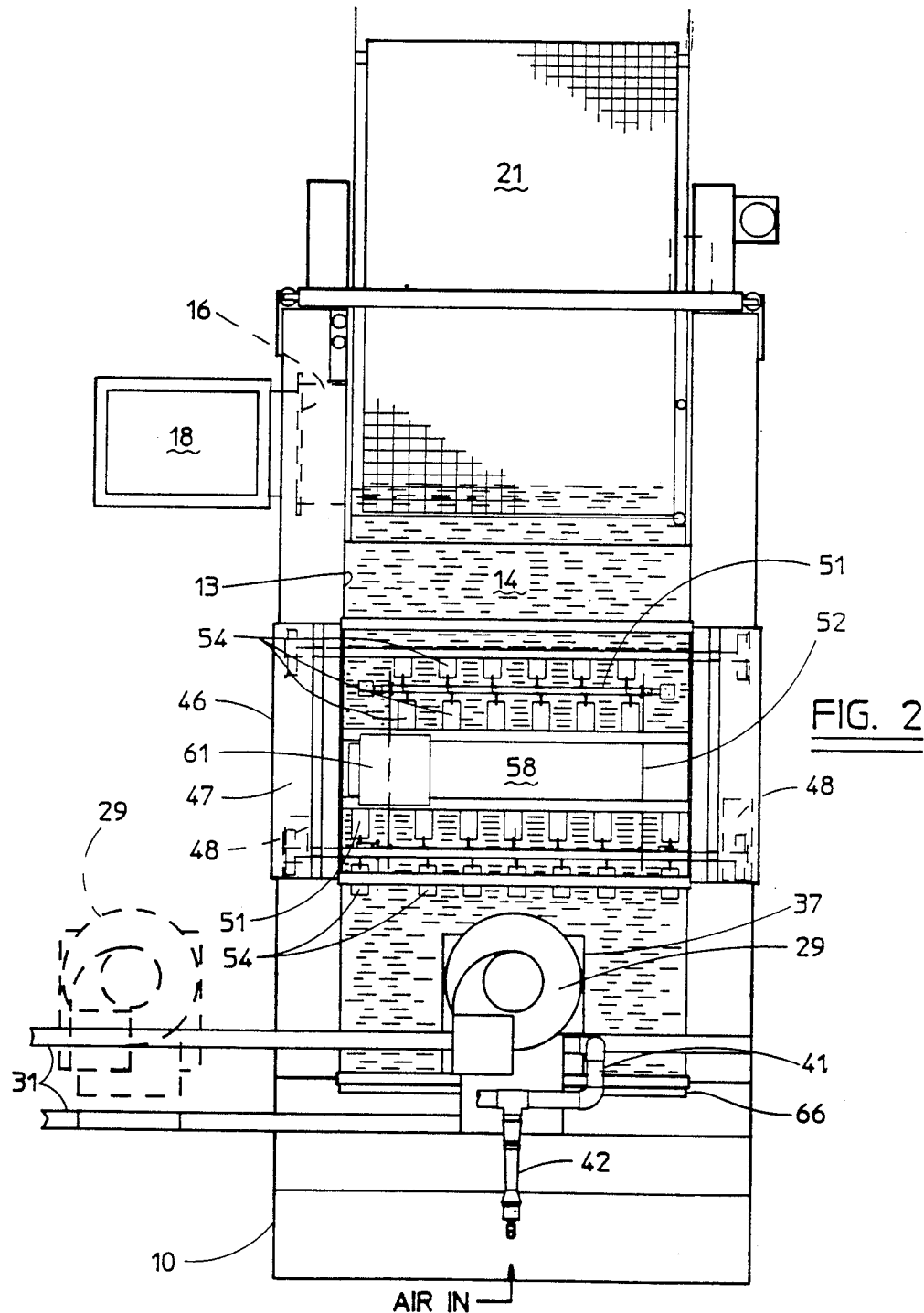
FIG. 2 is a plan view on an enlarged scale of the apparatus shown in FIG. 1.

A batch fry cooker 10 equipped to perform the process of the present invention is shown in the drawings and referring particularly to FIGS. 1 and 2, comprises a sheet metal housing 11 supported on legs 12 and including a generally rectangular vat 13 for containing a body of cooking oil 14. An insulated firebox 16 is arranged in a lower portion of the housing 11 and is provided with a gas burner 17 serving to furnish heat to the vat 13 for raising the temperature of the cooking oil 14. A stack or chimney 18 communicates with the firebox 16 and carries the products of combustion outside of the processing plant. Suitable couplings (not shown) are provided to the cooking vat or pan so that oil may be introduced or removed from the vat. Suitable temperature sensors 15 are provided coupled to the gas burner 17 through a control logic system so that when the oil temperature in the vat 13 should fall, say, after the introduction of a batch of potato slices 19, the gas burner 17 will be engaged to supply a greater quantity of heat to the vat so that the cooking may take place at higher cooking temperatures, if that be desired.

A takeout conveyor 21 is operatively mounted in one end of the cooker 10 and arranged with a portion disposed below the level of the cooking oil 14 so that the conveyor may receive the cooked product thereupon for removal from the vat 13 at the end of a batch cooked cycle. The takeout conveyor 21 may be of conventional construction employing a wire mesh belt, as illustrated, and driven by a motor (not shown) so that the top rim of the conveyor belt may lift the product from the vat upwardly and onto another conveyor or other depository in the plant (not shown). For ease of cleaning, the takeout conveyor 21 may be equipped to be raised such as by hydraulic cylinders 22 so that a thorough cleaning can be made of the cooker 10.

A pivotal dam or gate 26 extends over the lower end of the takeout conveyor 21 as illustrated in FIGS. 1, 4-7 and serves to define in its lower condition, as shown in FIGS. 1, 4-6, one end of the cooking vat and prevent the potato slices from lodging upon the takeout conveyor. The dam or gate 26 extends laterally across the full width of the cooking vat 13 and is coupled to the hydraulic cylinder 27 through a chain or cable 28 so that the dam 26 may be shifted from a lowered position, as illustrated in FIG. 1, to a raised position shown in FIG. 7 for permitting a batch of cooked potato chips to be received upon the takeout conveyor for removal from the vat. The dam is suitably mounted at its upper ends to the housing 11 through a shaft and bearing assembly (not shown) well known in this art.

Figure 3:
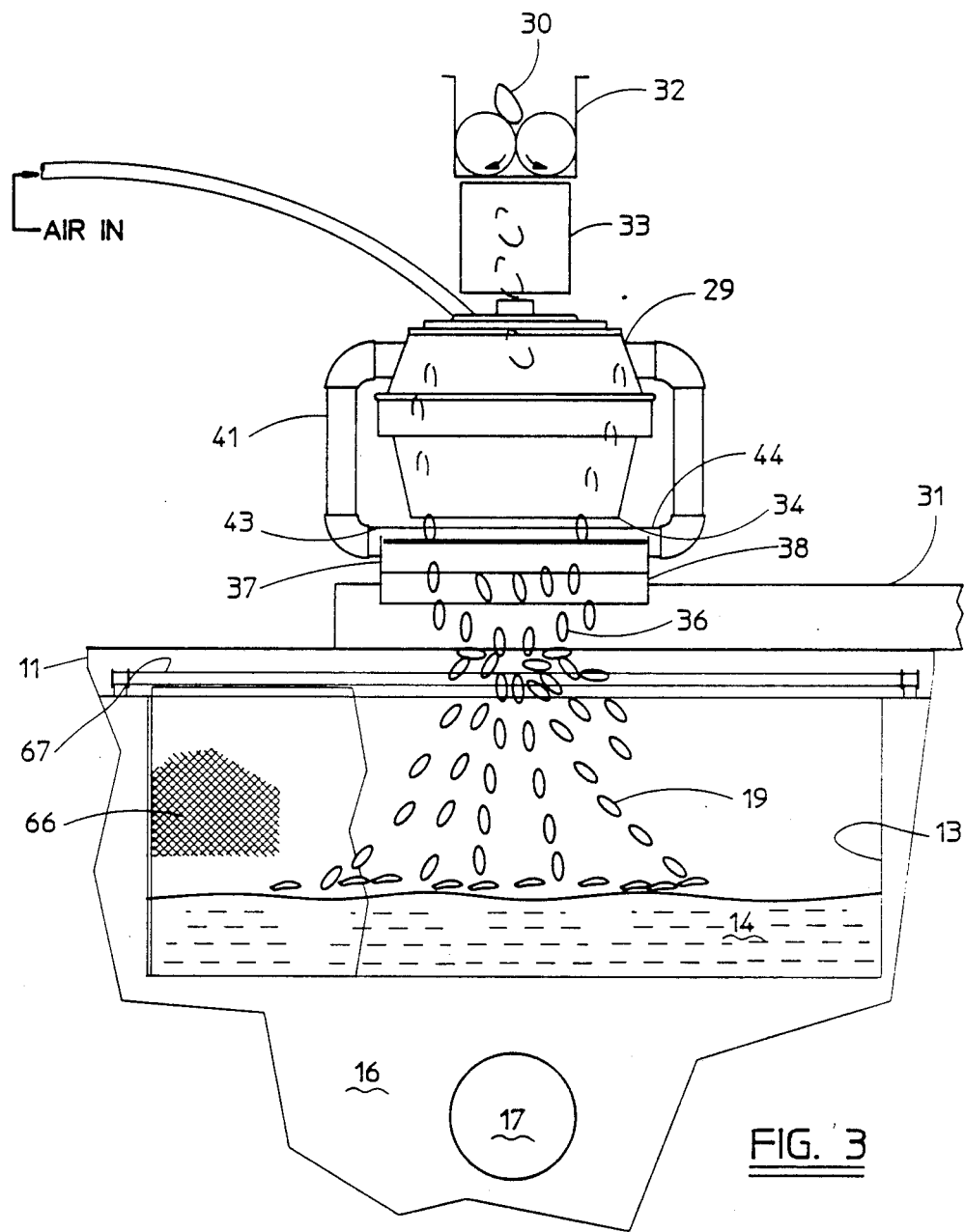
FIG. 3 is an enlarged fragmentary sectional view taken in the direction of the arrows 3—3 in FIG. 1.

Referring specifically to FIGS. 1 and 2, a potato slicer 29 is operatively mounted on a spaced pair of rails 31 extending laterally of the cooker 10 and arranged so that the slicer 29 may be shifted from the position shown in full lines in FIG. 2 to a second position as illustrated in broken lines, an out of the way position but one permitting the slicer to be employed for depositing potato slices in an adjacent cooker (not shown) so that the slicer 29 may serve two batch cookers in alternate fashion. The slicer 29 is mounted on a carriage which is movable on the rails 31 by a driving motor (not shown) so that the slicer may participate in the control logic sequence, illustrated in FIG. 9, of being in place over the cooking vat 13 only when necessary for slicing potato products and thereafter may be moved to serve an adjacent cooker or placed in simply an out of the way position while cooking moves forward in the unit 10. A supply of potatoes is delivered to the inlet of the slicer 29, as illustrated in FIGS. 1 and 3, potatoes arriving in an auger 32 which deposits the potatoes one at a time into the receiver 33 of the slicer. The slicer 29 may be any of those commercially available in the field such as a Urschel slicer Model CC and adapted to slice potatoes at desired thicknesses for frying. The potatoes 30 may be sliced in batches on the order of 100 to 150 pounds, batches of 120 pounds being typical. Potatoes 30 issue from a discharge 34 of the slicer 29 as slices 36 in multiple rapid fashion which could be characterized as a flurry of slices 36. As shown in FIGS. 1 and 3, a discharge chute 37 is mounted below the slicer discharge 4 and extends outwardly and downwardly at a shallow angle from the rear of the slicer to terminate in a lip 38. The discharge chute is provided with upstanding sides 39 so as to confine the slices and to define a path for a blast of air which serves to sweep the slices 36 from the chute in airborne fashion out over the vat of cooking oil 14, as illustrated in FIGS. 1 and 3.

More specifically, an air blast manifold 41 is mounted on the slicer carriage and includes a venturi inspirator 42 coupled to the manifold and operative to receive a supply of compressed air on the order of 50 to 90 psi and to entrain a large volume of ambient air for discharge through a dispersion slot 43, or air from a blower at about 8 oz. pressure may be used as an alternate supply source for discharge through the dispersion slot 43 arranged in a manifold tube 44 disposed to define a rear portion of the slicer discharge chute 37, shown in FIG. 3. Air is supplied to the manifold 41 as indicated in FIGS. 1-3 to exit the manifold 41 in a high velocity blast through the dispersion slot 43 so as to receive in the blast of air the slices descending from the slicer and to carry the slices airborne over the surface of the cooking oil where they may descend in free fall with a minimum of layering, preferably in a layer of one slice thickness in the oil. This has been found to substantially reduce the incidence of clumping upon introducing cold, uncooked potato slices into the body of hot cooking oil which was the problem of longstanding in this field.

Once the batch of potatoes 30 have been sliced by the slicer and dispersed in airborne fashion over and into the cooking oil 14, the slicer may be shifted to the out of the way position illustrated in FIG. 2 in broken lines and it resides there during the remainder of the cooking cycle.

Figure 4:
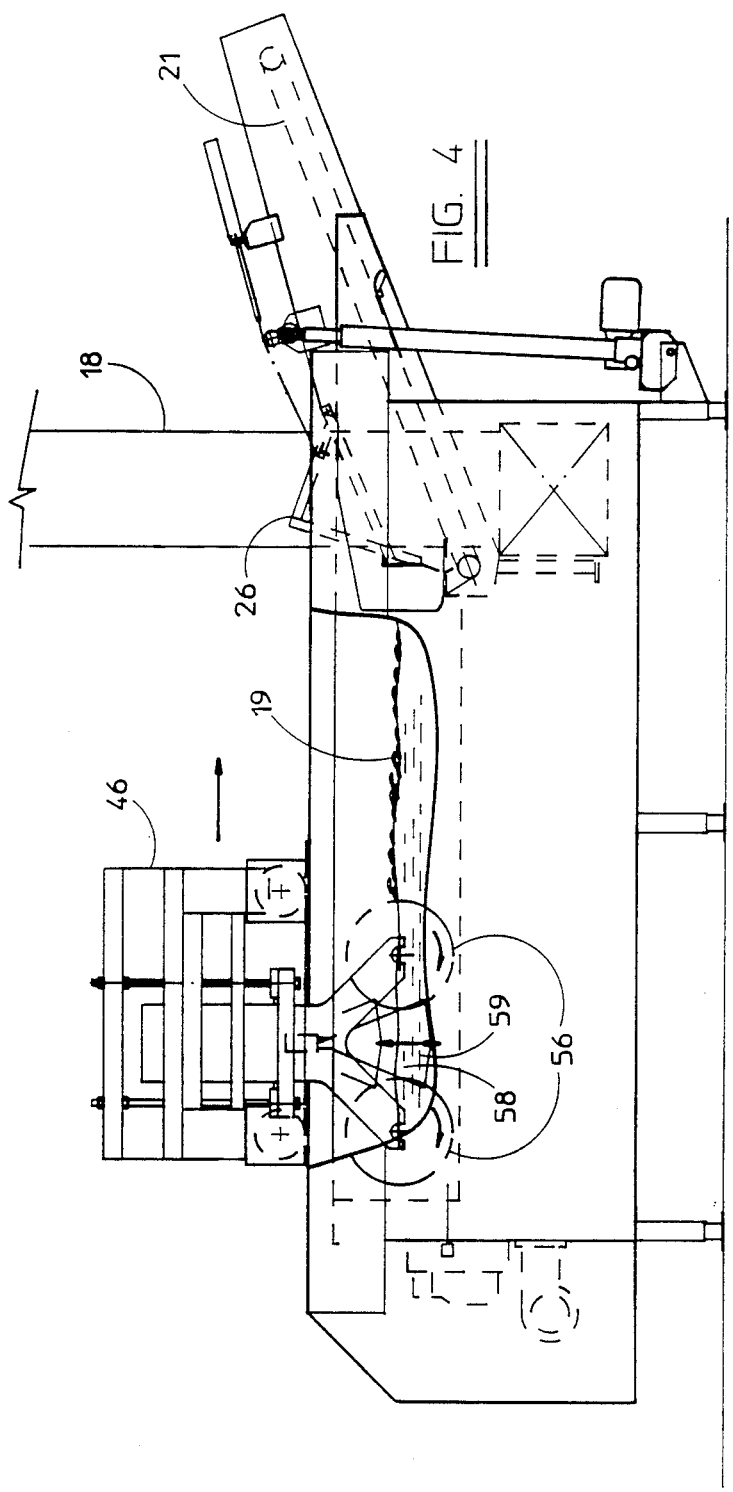
FIGS. 4 through 7 illustrate steps in the stirring, dunking or submerging and sweeping of the chips during the cooking cycle.
Figure 5:
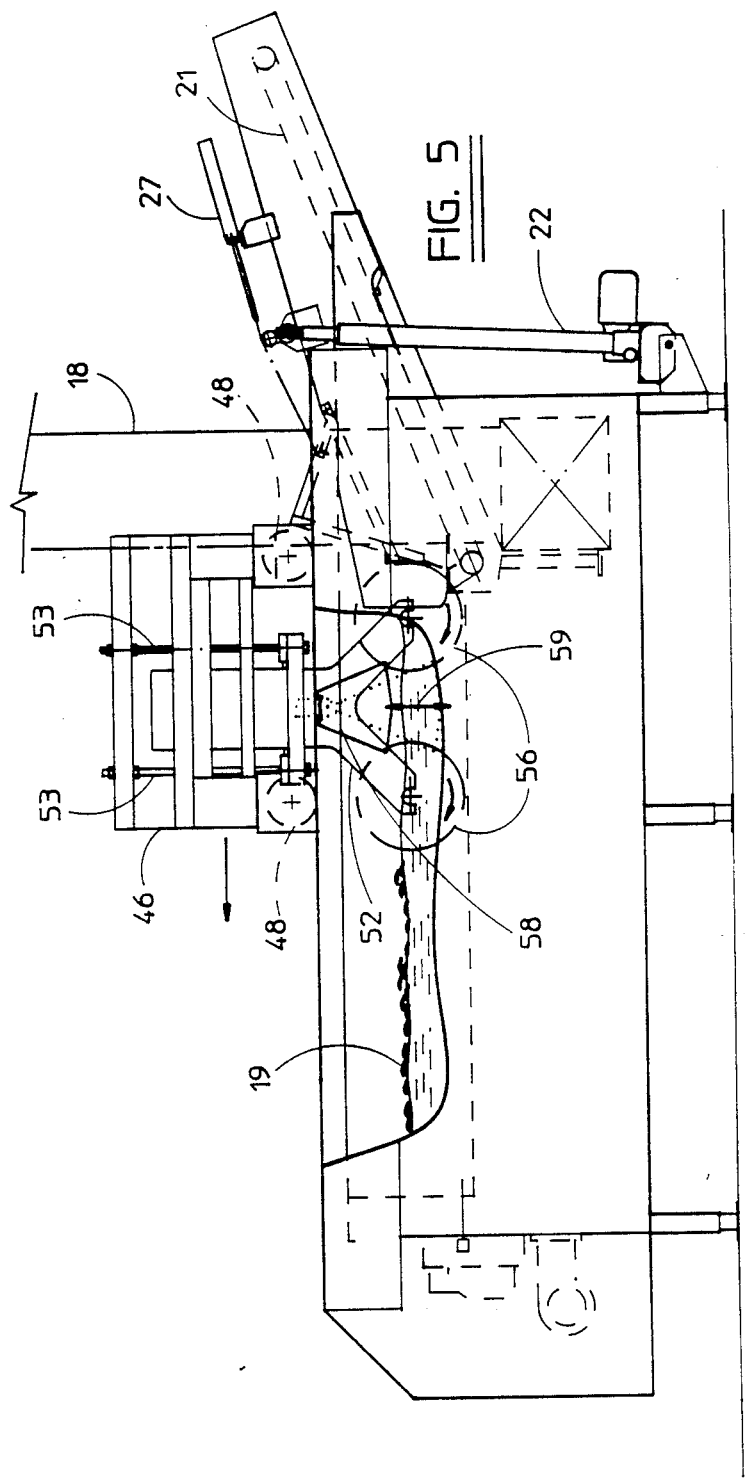
Figure 6:
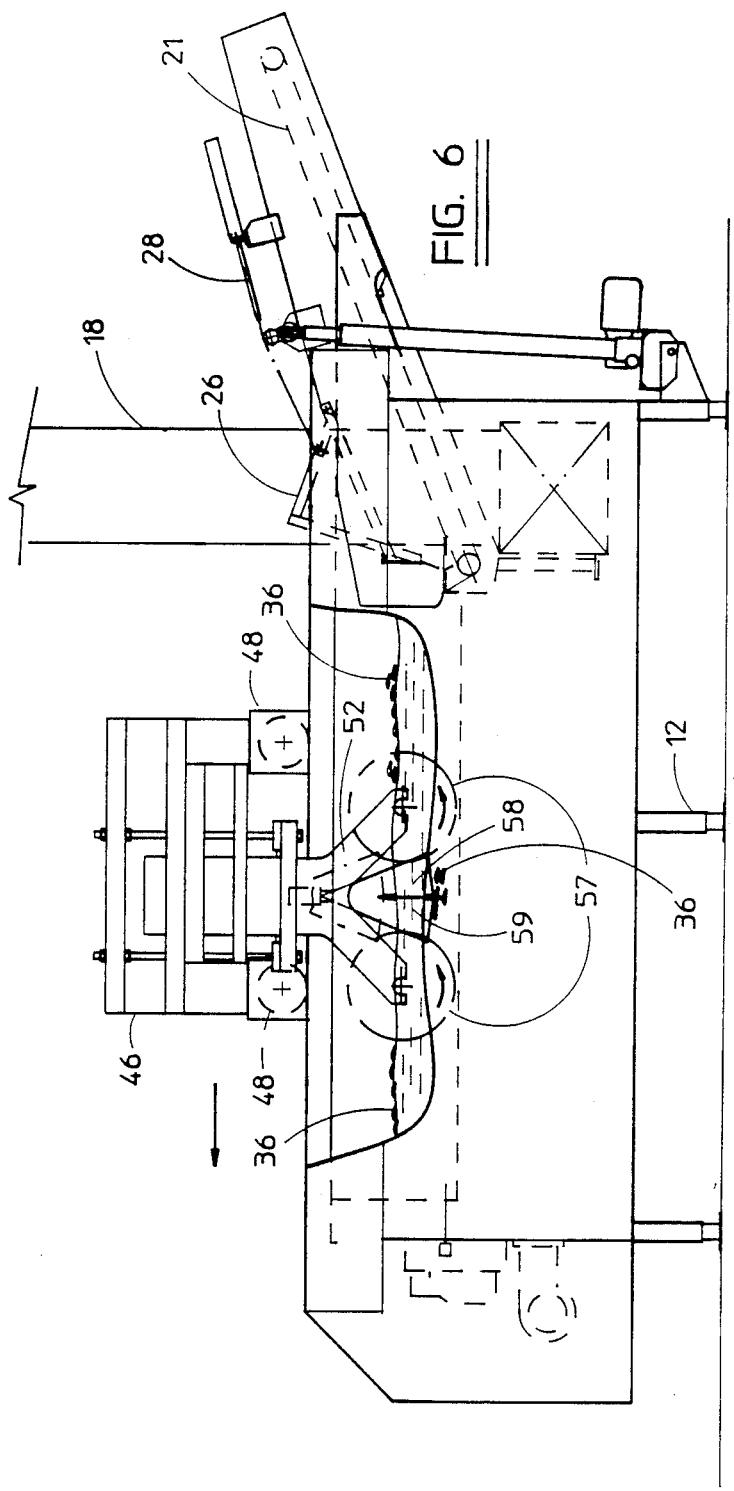
Figure 7:
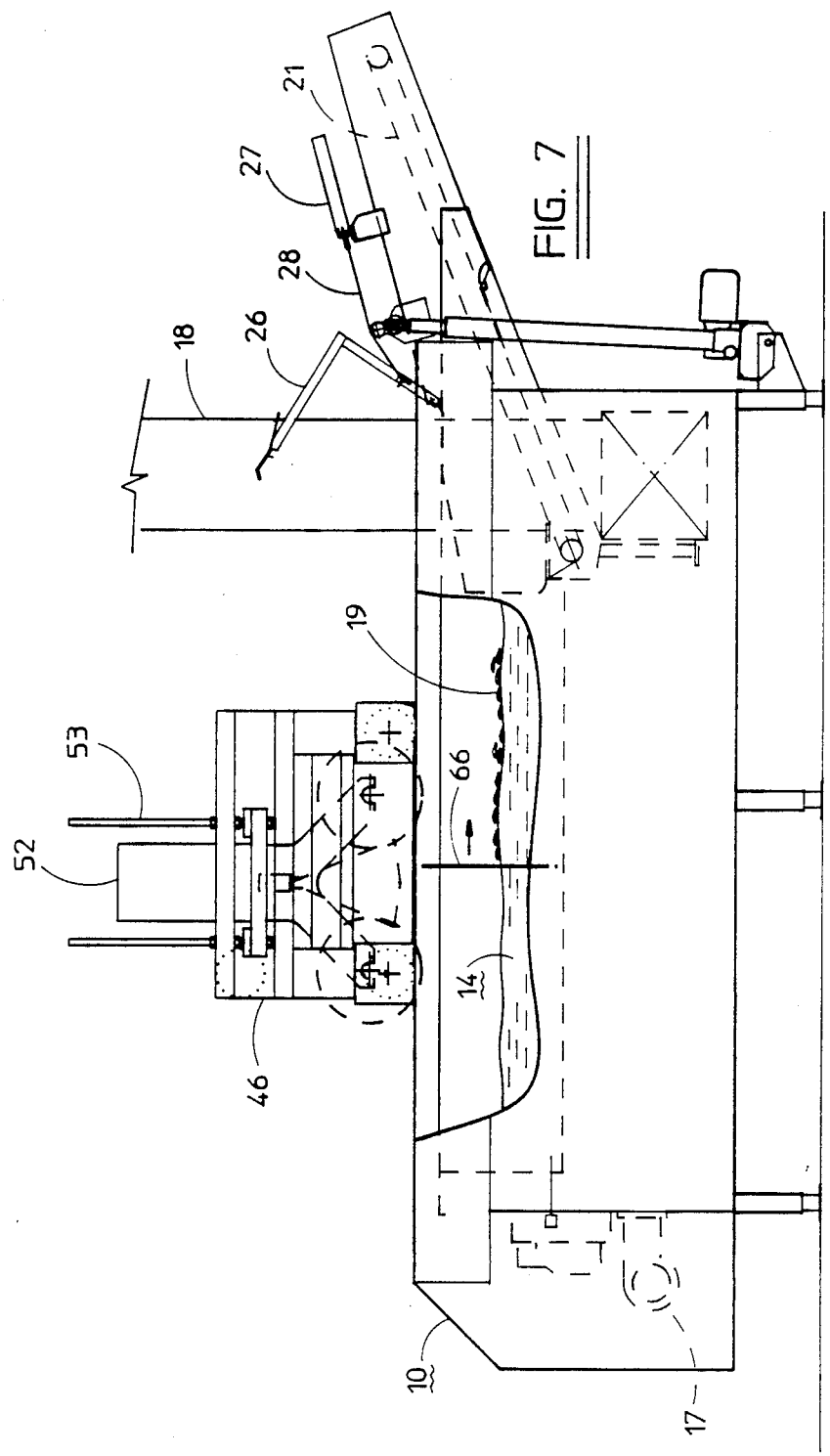

To promote uniformity of cooking and color of the slices 36 and to reduce substantially the incidence of chips clumping during cooking, a motor driven paddle and dunker mechanism 46 is provided on the batch cooker 10. The paddle and dunker mechanism 46 is arranged on a carriage 47 which is motor driven to traverse the cooking vat 13 and to straddle the cooker 10, as shown in FIGS. 1 and 2. The carriage is equipped with a wheel 48 at each of its four corners which rides on a track defined by the top flange on the housing 11. The paddle and dunker mechanism is equipped to move in accordance with a program sequence, shown in FIG. 9, from an extreme left hand position as illustrated in FIG. 4 to an extreme right hand position as illustrated in FIG. 5 to achieve the desired chip mixing and dunking operation. Further, the paddle and dunker operative components are mounted on the carriage 47 and are arranged for movement vertically from a position above the oil level as illustrated in FIGS. 1 and 7 to a lowered position where the paddle and dunker mechanism, may be active in the cooking oil for mixing and dunking, as illustrated in FIGS. 4-6. The paddle wheel and dunker mechanism is retracted from the oil during the slice loading operation as illustrated in FIG. 1, and for the slice removal operation as illustrated in FIG. 7, as indicated in the logic sequence of FIG. 9.

Two paddle wheels 51 are journalled at each of their ends to a yoke 52 which is mounted to the carriage 47 to be movable vertically along the upwardly extending guide rods 53 so that the paddle wheels and dunker mechanism may be raised and lowered with respect to the cooking oil 14. Each paddle wheel is equipped with an array of paddles 54 disposed at varying attack angles with respect to the cooking oil so as to create a somewhat turbulent flow pattern for agitation of the chips as the paddle wheels rotate. The paddle wheels 51 are driven by motor means (not shown) so as to rotate together either in the directions indicated by the arrows 56, 57 in the drawings.

A submerger or dunker mechanism 58 is arranged on the carriage 47 between the spaced apart paddle wheels 51 and is mounted and driven to reciprocate vertically as indicated by the arrow 59 over a stroke extending just above the oil level as indicated in FIG. 5 to a lower position below the oil level as illustrated in FIGS. 4 and 6. The dunker 58 extends laterally the full width of the vat 13, as illustrated in FIG. 2. Motor means 61 are arranged on the carriage 47 serving to reciprocate the dunker over about a four inch stroke at 30 strokes per minute. The paddle wheels 51 are motor driven to rotate at about 35 to 40 rpm in directions indicated by the arrows 56 and 57, FIGS. 5 and 6, as dictated by the program logic controller, FIG. 9, and related to the direction of movement or travel of the carriage 47.

More specifically, it is the function of the paddle and dunker mechanism to mix the batch of slices uniformly and continuously during the cook cycle by urging the chips which may be disposed, for example, on the right side of the vat as viewed in FIG. 4 through the paddle array and beneath the dunker, as illustrated in FIG. 6, to a position where the batch of slices is located as shown in FIG. 5. Because the dunker or submerger 58 extends laterally the full width of the vat, each of the slices, more than likely, will be encountered by the dunker as the slices are moved from one end of the vat to the other. Thus, as the carriage 47 moves to the right as illustrated in FIG. 4, the paddle wheels rotate clockwise as indicated by arrows 56. Conversely, when the carriage is moving to the left as viewed in FIG. 6, the paddle wheels rotate counterclockwise as indicated by the arrows 57.

To insure that the ends of the vat are cleared of chips as the carriage approaches the limit of its travel, the paddle wheels 51 continue to rotate for about five seconds in the same rotational direction even as the carriage changes direction. This is illustrated in FIGS. 4 and 5, where in FIG. 5 the carriage has just begun moving towards the left but the paddle wheels continue the direction of rotation 56 undertaken when the carriage moved to the right as indicated in FIG. 4. After the brief period of reverse direction of the carriage, the paddle wheels stop and are then rotated in the opposite direction 57 such as illustrated in FIG. 6. This delay in change of direction of the paddle wheels following the change of direction of the carriage, has been found to enable almost complete clearing of slices from the ends of the cooking vat and thus insuring uniform cooking of the slices and does not permit slices to dwell and undercook in one end or the other of the vat.

A sweep conveyor 66 is arranged to gather the cooked chips and urge them towards the takeout conveyor 21 upon completion of the cooking period, FIG. 7. As shown in FIGS. 2 and 3, the sweep conveyor extends laterally across the vat 13 and comprises a screen like mesh which drapes from a conveyor rod 67 which is equipped to be moved from one end of the vat 13 to the other. The conveyor curtain extends from the rod 67 to beneath the oil surface and preferably touches the bottom of the vat so that all cooked portions of the potato slices may be carried from the oil onto the takeout conveyor. It will be understood that the sweep conveyor 66 occupies a position, when not in use, at the end of the vat opposite the takeout conveyor so that the full length of the vat between the sweep conveyor 66 and pivotal dam 26 may be used as a cooking zone which is traversed by the paddle and dunker mechanism 46. Before shifting the sweep conveyor into operation, the paddle and dunker mechanism 46 is raised from the lowered active position as illustrated in FIGS. 4–6 to the raised, out of the way, position as illustrated in FIGS. 1 and 7.

Operation

Figure 8:
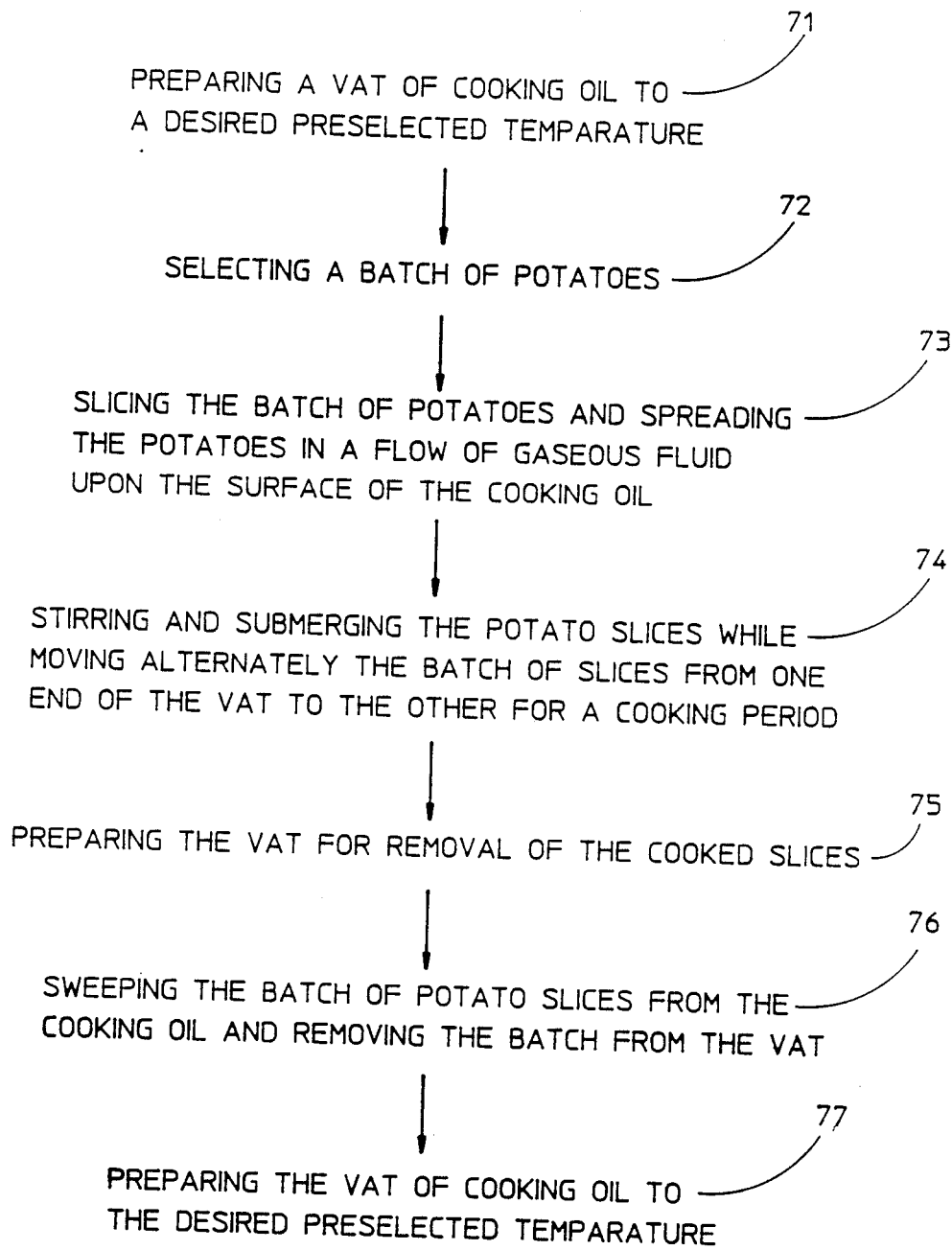
FIG. 8 is a flow diagram of the process of the present invention.
Figure 9A:
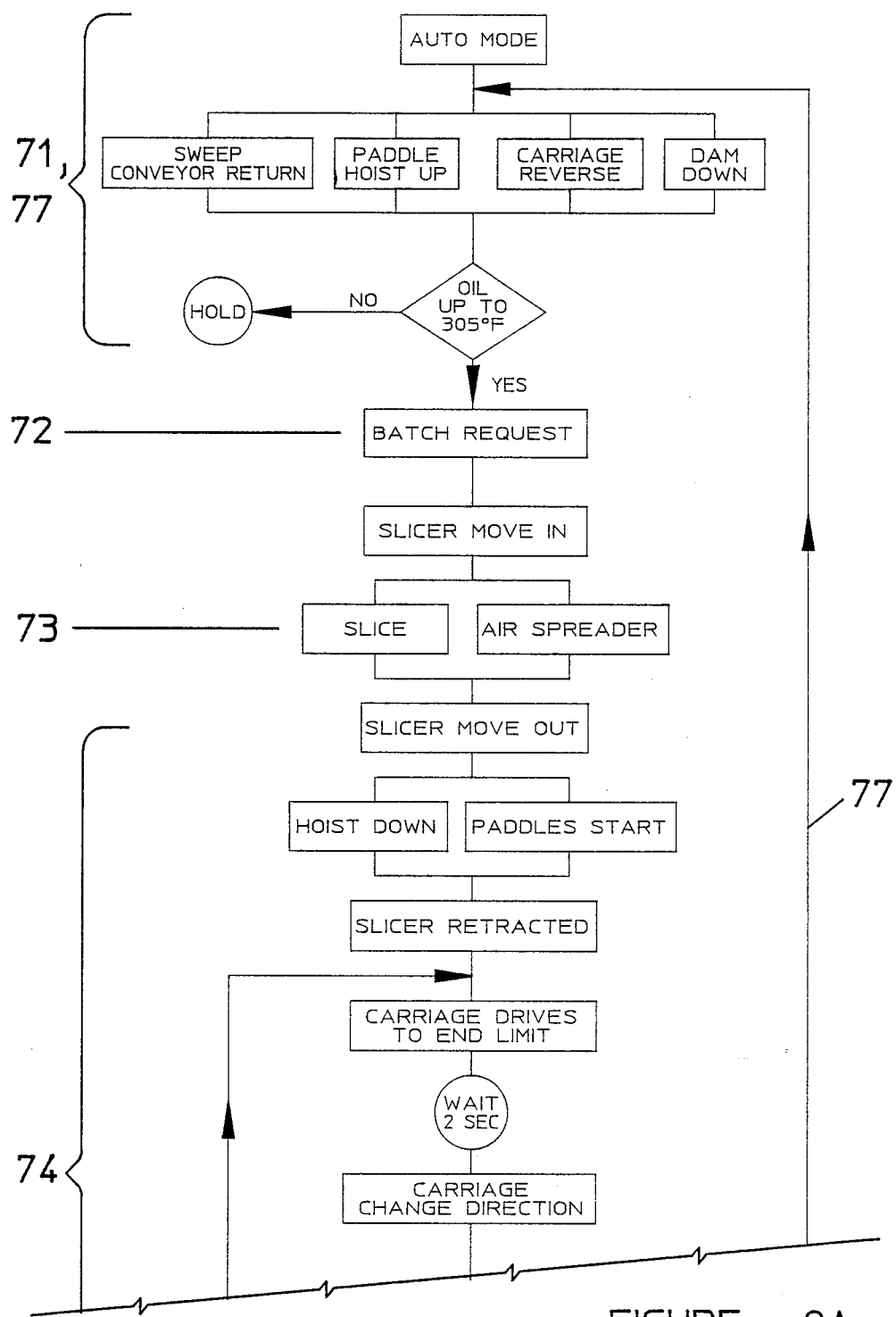
FIG. 9 is a schematic diagram showing the logic sequence of the automatic controller for the apparatus performing the process of the present invention.
Figure 9B:
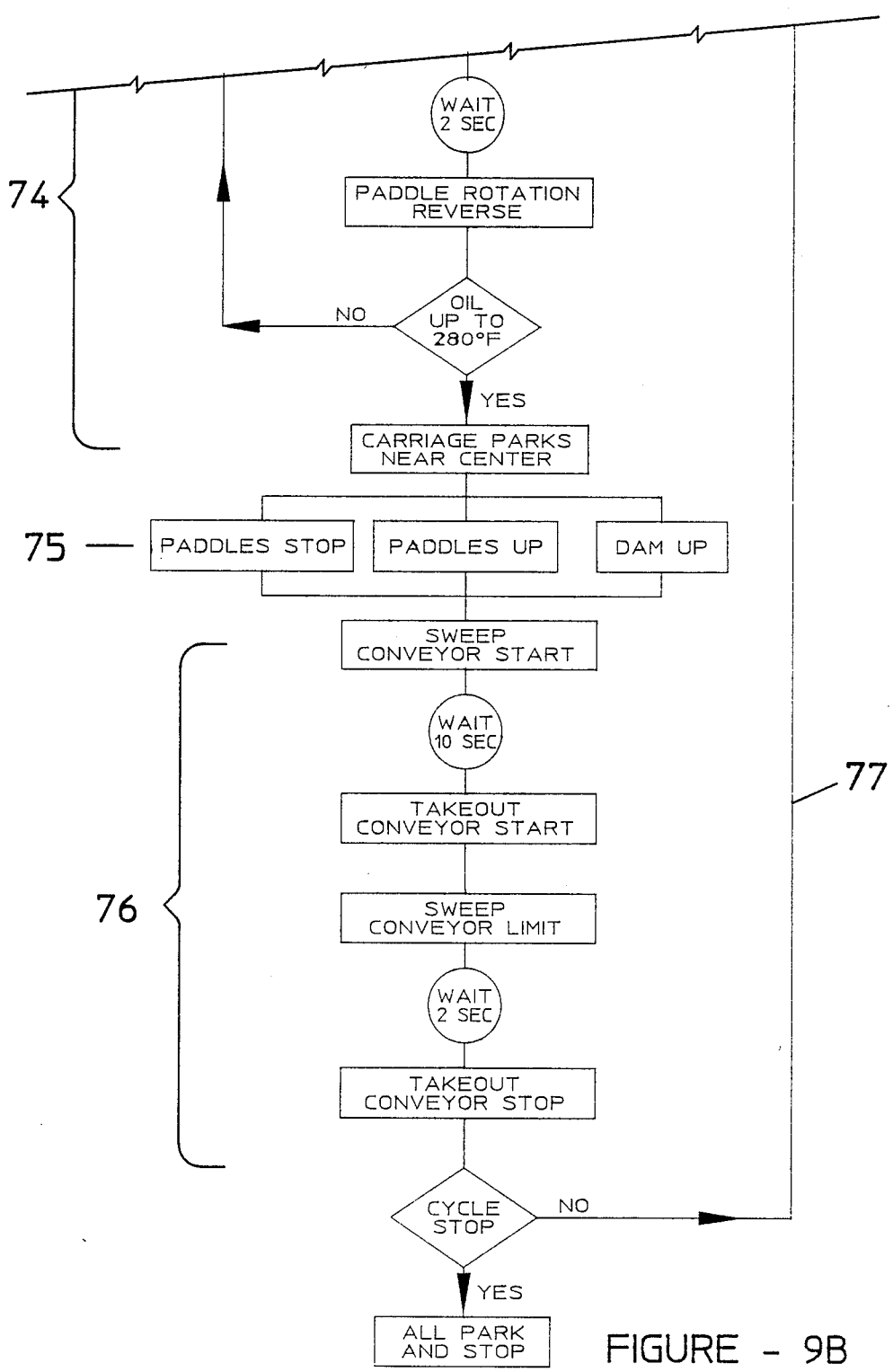

In the carrying out of the process of the subject invention, reference may be had to the flow chart of FIG. 8, and the operation program of the programable logic controller shown in FIG. 9. A suitable programable logic controller for this invention is the Allen-Bradley SLC-150 programable logic controller available from the Allen-Bradley Company, 1201 South Second Street, Milwaukee, Wis. 53214. As a first Step 71, the vat of cooking oil is prepared to a desired cooking temperature, for example, 305° F. A typical batch of potatoes can be selected, for example, a batch weighing approximately 120 pounds of peeled potatoes, representing Step 72. The potato slicer 29 is moved into position along the rails 31 to a mid-position over the cooking vat 13 and the air jet 42 is turned on so as to generate the blast of air through the dispersion slot 43. Potatoes are fed to the slicer through the auger 32 and it has been found that it takes about 45 to 50 seconds to slice approximately 120 pounds of potatoes. The air jet scatters the slices uniformly over the surface of the cooking oil 14, minimizing the tendency towards clumping. Thus completes Step 73 in FIG. 8.

The potato slicer 29 is then moved along the rails 31 to an out of the way position as illustrated in FIG. 2. The paddle and dunker mechanism 46 is lowered into the cooking oil from the position shown in FIG. 1, to that illustrated in FIGS. 4 through 6, and the stirring rotation is begun while the carriage 47 moves back and forth at a rate of approximately six cycles a minute. The stirring and submerging operation, 74, moves the potato slices from one end of the cooking vat to the other as may be seen by comparing FIG. 4 with FIG. 5. When the carriage 47 is moving to the right, as illustrated in FIG. 4, the paddle wheels 51 rotate clockwise to the end portion of the vat and continue clockwise rotation for about two seconds of the return left movement. The paddles then stop and reverse rotation to counterclockwise. When the carriage reaches the end of the left stroke, it starts back to the right and the paddles continue counterclockwise for about two seconds and then stop and reverse to clockwise rotation. This cycle is repeated each time.

The stirring and dunking action continues in the cooking process for about 7 to 9 minutes or until the oil temperature is returned to about 280° F. by actuation of the gas burner 17 or other heat source. When the preselected end cooking temperature is reached, the program controller stops the stirring action and the carriage is elevated so as to remove the paddle and dunker mechanism to the raised position as indicated in FIG. 7. The dam or gate 26 is pivoted clockwise from a lowered position as indicated in FIG. 6 to the raised position as indicated in FIG. 7, thus preparing the vat for removal of the cooked slices: Step 75 in FIG. 8.

The sweep conveyor 66 is then advanced across the length of the cooking vat to gather together the potato slices or cooked chips and move the chips to the takeout conveyor 21. When a desired chip pack is developed on the takeout conveyor, the conveyor drive mechanism is started to elevate the chips from the cooker, permitting the oil to drain from the chips, and for further handling: Step 76 of FIG. 8.

When the cooking vat is cleared of chips, the swinging dam or gate 26 is lowered into the position as shown in FIG. and the sweep conveyor is retracted to the other end of the vat 13. The gas burner 17 may continue to fire so as to return the oil temperature to the starting point of about 305° F.:Step 77, FIG. 8. The total time of the cook cycle averages about nine and a half to ten minutes. Changing temperature conditions, potato batch sizes, potato slice thickness and solid contents will change the cycle time and chip texture, however, all the stirring mechanism action will remain the same. At the parameters all can be controlled as is well known in the field by a programable logic controller such as the Allen-Bradley SLC-150 connected to suitable limit switches and temperature sensors 15.

The above disclosure is considered at present to be the preferred form of the invention; however, it will be understood that numerous variations and modifications may be made in it by those skilled in the field and it is intended to cover in the claims which follow all such variations and modifications as fall within the true spirit, scope and equivalence of the invention.

What is claimed is:

1. A batch cooker for preparing potato chip including means serving as a vat for containing a supply of cooking oil, means for heating the oil in the vat, potato slicer means arranged so that its discharge is disposed above the vat, air propelled slice dispensing means disposed below said slicer means and serving to disperse in a blast of air a batch of uncooked potato slices upon the surface of the cooking oil, means for dunking and stirring the slices while in the cooking oil, and means serving to remove the slices from the oil upon completion of the cooking cycle.

2. The batch cooker of claim 1 wherein said dunking and stirring means includes a carriage operatively mounted for movement to and fro towards one end of the vat and then the other, a spaced apart pair of paddle wheels operatively mounted on said carriage and equipped for selective rotation in the cooking oil in first one direction and then the other, as the carriage moves to and fro with respect to said vat, a dunker mechanism arranged intermediate said spaced pair of paddle wheels and being equipped to move in a stroke extending below the surface of the cooking oil and then rising above such surface so as to engage and submerge the potato slices propelled by said paddle wheels, said dunker and stirring mechanism being equipped for movement from a position wherein said paddle wheels and dunker mechanism are operatively disposed in the cooking oil to a retracted position where said dunker mechanism and paddle wheels are disposed substantially above the surface of the cooking oil in the vat.

3. The batch cooker as stated in claim 1 wherein said air propelled sliced dispensing means includes chute means having an opening at a discharge end thereof, tubular air conduit means including nozzle means arranged with respect to said chute so that the discharge from said nozzle means projects a blast of air across said chute towards the discharge end thereof.

4. In a batch potato chip cooker having a cooking vat to contain cooking oil,
   means for heating the cooking oil,
   means to sense the temperature of the cooking oil,
   potato slicer means positioned so as to present potato slices issued therefrom into the cooking oil,
   potato slice stirring and dunking means operative in said vat to stir and dunk potato slices in the cooking oil and being equipped so as to be retractable from the cooking oil into an out of the way position,
   takeout conveyor means having a receiving end disposed below the oil surface permitting the slices to be received on the takeout conveyor for discharge from the vat,
   dam means serving to block in one position the slices from said takeout conveyor and being shiftable to another position permitting the slices to be received on the takeout conveyor for discharge from the vat, and
   an automatic control means operative to sense delivery of a batch of potatoes to the potato slicer means and once a condition is achieved wherein said dam means is in the position blocking slices from said takeout conveyor, then the control means permits the slicer means to commence slicing and the potatoes to move through the slicer means until a batch of slices is furnished to the vat,
   then the control means causes the slicer means to cease the supply of slices to the vat,
   the control means then causing the dunker and stirring mechanism to move into the cooking oil for operative movement of the dunker and slicer for urging and mixing the potato slices from one end of the vat to another until such time as the slices are cooked,
   and then the control means is operative to cause the dunker and slicer means to move to an out of the way position and the dam means to shift to the position permitting potato slices to be received on the takeout conveyor for discharge from the vat,
   and then the control means causes the takeout conveyor to remove the cooked potato slices from the vat,
   and then the control means dwells until the cooking oil temperature selected as the initial cooking temperature is reached, then the control means permits the cycle to be repeated.

* * * * *

UNITED STATES PATENT AND TRADEMARK OFFICE
CERTIFICATE OF CORRECTION

PATENT NO. : 4,977,821

DATED : December 18, 1990

INVENTOR(S) : Benson, et al.

It is certified that error appears in the above—identified patent and that said Letters Patent is hereby corrected as shown below:

In column 4, line 2, delete "4" and insert --34-- therefor.

In column 7, line 11, insert --1-- after "FIG".

Signed and Sealed this

Ninth Day of June, 1992

Attest:

DOUGLAS B. COMER

*Attesting Officer*  *Acting Commissioner of Patents and Trademarks*